(12) United States Patent
Lehnertz

(10) Patent No.: US 9,950,723 B2
(45) Date of Patent: Apr. 24, 2018

(54) DANGER ZONE MONITORING AT A GRADE CROSSING

(71) Applicant: Robert Bosch GmbH, Stuttgart (DE)

(72) Inventor: Benedikt Lehnertz, Ludwigsburg (DE)

(73) Assignee: ROBERT BOSCH GMBH, Stuttgart (DE)

( * ) Notice: Subject to any disclaimer, the term of this patent is extended or adjusted under 35 U.S.C. 154(b) by 388 days.

(21) Appl. No.: 14/703,361

(22) Filed: May 4, 2015

(65) Prior Publication Data
US 2015/0323663 A1 Nov. 12, 2015

(30) Foreign Application Priority Data
May 7, 2014 (DE) .................. 10 2014 208 522

(51) Int. Cl.
| | | |
|---|---|---|
| *G01S 13/04* | (2006.01) | |
| *B61L 29/30* | (2006.01) | |
| *G01S 13/88* | (2006.01) | |
| *G01S 13/72* | (2006.01) | |
| *G01S 7/41* | (2006.01) | |
| *B61L 29/00* | (2006.01) | |
| *B61L 23/04* | (2006.01) | |

(52) U.S. Cl.
CPC ............ *B61L 29/30* (2013.01); *B61L 23/041* (2013.01); *B61L 29/00* (2013.01); *G01S 7/411* (2013.01); *G01S 13/72* (2013.01); *G01S 13/88* (2013.01)

(58) Field of Classification Search
CPC ............................... B61L 29/30; B61L 23/041
USPC ................................ 342/27–28, 90
See application file for complete search history.

(56) References Cited

U.S. PATENT DOCUMENTS

| | | | | |
|---|---|---|---|---|
| 6,340,139 B1 * | 1/2002 | Hilleary | .................. | B61L 29/08 246/125 |
| 6,641,091 B1 * | 11/2003 | Hilleary | .................. | B61L 29/08 246/111 |
| 6,933,858 B2 * | 8/2005 | Pieralli | ................... | B61L 29/30 246/292 |
| 9,126,609 B2 * | 9/2015 | Steffen, II | ............... | B61L 23/00 |
| 2007/0274158 A1 * | 11/2007 | Agam | .................. | B61L 23/041 367/96 |
| 2008/0136632 A1 * | 6/2008 | Pieralli | ................... | B61L 29/30 340/552 |

(Continued)

FOREIGN PATENT DOCUMENTS

| | | |
|---|---|---|
| CN | 202272022 U | 6/2012 |
| CN | 103661503 A | 3/2014 |

(Continued)

*Primary Examiner* — Marcus E Windrich
(74) *Attorney, Agent, or Firm* — Norton Rose Fulbright US LLP; Gerard Messina

(57) ABSTRACT

In a method for identifying a danger zone to be monitored at a grade crossing, the following are performed: at least one radar sensor is situated at the danger zone; object trajectories from sequences over time of object positions of respective objects moving through the danger zone are ascertained by the radar sensor; the position of at least one traffic path is identified with the aid of an accumulation of object trajectories; the positions of barrier straight lines are ascertained with the aid of radar reflections of the closed barriers; and the danger zone is determined by linking information on the identified position of the at least one traffic path with information on the ascertained position of the barrier straight lines.

18 Claims, 6 Drawing Sheets

(56) References Cited

U.S. PATENT DOCUMENTS

| | | | |
|---|---|---|---|
| 2012/0286103 A1* | 11/2012 | Hilleary | B61L 23/041 246/125 |
| 2013/0018534 A1* | 1/2013 | Hilleary | B61L 29/30 701/19 |
| 2013/0194423 A1* | 8/2013 | Baines | B61L 29/28 348/148 |
| 2013/0261950 A1* | 10/2013 | Sasabuchi | B61L 23/041 701/301 |
| 2014/0159941 A1* | 6/2014 | Yasugi | B61L 23/041 342/28 |
| 2016/0265914 A1* | 9/2016 | Hunter | G01C 7/02 |

FOREIGN PATENT DOCUMENTS

| | | |
|---|---|---|
| DE | 196 12 579 | 10/1997 |
| DE | 10 2006 040 542 | 3/2008 |
| DE | 10 2007 032 091 | 4/2009 |

\* cited by examiner

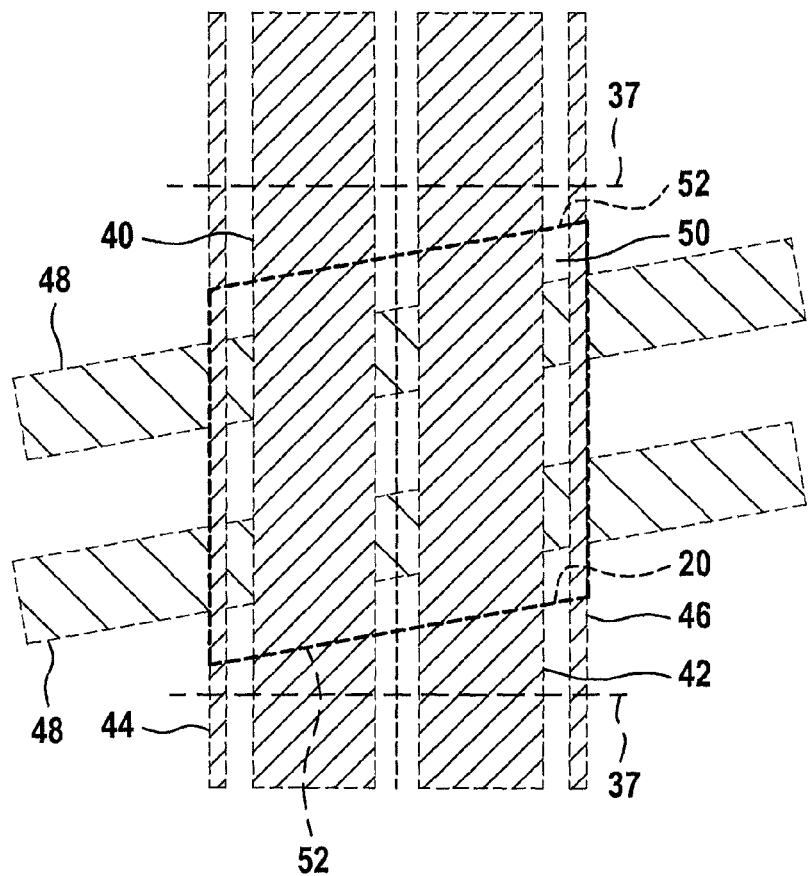

DANGER ZONE MONITORING AT A GRADE CROSSING

BACKGROUND OF THE INVENTION

1. Field of the Invention

The present invention relates to a device for monitoring a danger zone at a grade crossing, which has a system having at least one radar sensor situated at the danger zone, in particular, having at least one radar sensor for monitoring the danger zone, in whose field of view the danger zone lies.

2. Description of the Related Art

Published German patent document DE 10 2007 032 091 B3 describes a method for monitoring a grade crossing, in which an image is first taken, using cameras directed in a first direction and cameras directed in the opposite direction, of an object located on a road section on one side of a danger zone, and by comparing this image with the image of another camera, the object in a road section lying on the other side of the danger zone is recognized. This is supposed to enable making a notification that the danger zone at a grade crossing is clear of objects.

Published German patent application document DE 10 2006 040 542 A describes a device for monitoring a grade crossing using a video camera, whose signal is transmitted to an association of vehicles using radio signals. This is supposed to enable a leader of the association of vehicles to identify the area of the grade crossing, even though there is not yet any visual contact.

Published German patent application document DE 196 12 579 A1 describes a system for monitoring a danger zone at full barrier grade crossings having a rotating radar range finder which scans the danger zone horizontally. At the defined boundary of the danger zone, reference marking points are situated, in order to limit the scanning to the area within these marking points. Alternatively, sector elements of the danger zone may be stored according to length and angle, and the scanning of the danger zone using electronic devices may be limited to the stored sector elements.

In the known danger zone monitoring using the rotating radar range finder, the configuration of the zone to be monitored has to be adapted at great effort to the danger zone present.

BRIEF SUMMARY OF THE INVENTION

It is the object of the present invention to create a device for danger zone monitoring at a grade crossing using a radar sensor with which the set-up of the device is simplified.

According to the present invention, this object is attained by a device for danger zone monitoring at a grade crossing having at least one radar sensor for monitoring the danger zone, and having an identification unit which is designed to ascertain object trajectories from sequences over time of object positions of respective objects detected by radar sensors, moving through the danger zone, detect the position of at least one traffic path with the aid of an accumulation of object trajectories, ascertain the positions of barrier straight lines with the aid of radar reflections of the closed barriers, and determine the danger zone to be monitored by linking information on the detected position of the at least one traffic path with information on the ascertained position of the barrier straight lines.

The respective traffic path may, for instance, be a traffic path in the form of a traffic lane, a footpath or a track path. In the case of a traffic path for a means of transportation, such as a vehicle or trains, the traffic path is single-track, and then corresponds to a traffic lane or a track or track path.

A particularly simple set-up of the device is achieved in that the device is designed to determine the danger zone to be monitored by linking the information on the position of traffic paths with information on the position of barrier straight lines, the position of the traffic paths and the position of the barrier straight lines being detected. Thus the danger zone is able to be detected automatically, without this depending on an exact alignment or positioning of the radar sensor with the danger zone to be monitored. The device makes it possible automatically to detect the danger zone to be monitored reliably and with high accuracy. This substantially simplifies the planning of danger zone monitoring. In addition, because of the automatic identification of the danger zone, a high reliability of the monitoring is made possible. Possible errors during the installation and alignment of the radar sensor are able to be corrected, since the position and the extension of the danger zone to be monitored is calibrated with the aid of real object recordings. It is also advantageous that no further aids are required for setting up the monitoring of a danger zone, since the identification of the danger zone is able to take place with the aid of objects such as barriers, trains, vehicles, etc., that appear anyway in the later operation of the danger zone monitoring.

From the course over time of the object positions of a recorded object moving through the danger zone, an object trajectory is determined. For example, the ascertaining of object trajectories may include or consist in bringing together sequences over time of object positions of the respective objects that have been recorded by the radar sensor and are moving through the danger zone.

The identification of the position of at least one traffic path with the aid of an accumulation of object trajectories may, for instance, include or consist in adapting at least one position of a path to an accumulation of object trajectories and determining the adapted position as a position of a traffic path.

The ascertainment of positions of barrier straight lines with the aid of radar reflections of the closed barriers may include, for example, or consist in adapting positions of straight lines to positions of radar reflections of the closed barriers and to define the adapted positions as positions of barrier straight lines.

The object is particularly attained by a device for danger zone monitoring at a grade crossing, having at least one radar sensor for monitoring the danger zone, and having an identification unit which is designed to bring together sequences over time of object positions of respective objects detected by the radar sensor and moving through the danger zone, to form object trajectories, adapt at least one position of a path to an accumulation of object trajectories and to determine it as a position of a traffic path;

adapt the positions of straight lines to the positions of radar reflections of the closed barriers and define this as the positions of barrier straight lines;

determine the danger zone that is to be monitored by linking information on the detected position of the at least one traffic path to information on the ascertained position of the barrier straight lines.

The object is further attained by a method for identifying a danger zone at a grade crossing that is to be monitored while using location data of at least one radar sensor, in whose field of view the danger zone lies, having the steps:

ascertaining object trajectories from sequences over time of respective objects, detected by the radar sensor, that are moving through the danger zone;

detecting the position of at least one traffic path with the aid of an accumulation of object trajectories;

ascertaining the positions of barrier straight lines with the aid of radar reflections of the closed barriers; and determining the danger zone that is to be monitored by linking information on the detected position of the at least one traffic path to information on the ascertained position of the barrier straight lines.

The method may particularly correspond to the functioning of the identification unit of the device named above.

BRIEF DESCRIPTION OF THE DRAWINGS

FIG. 5 shows a schematic block diagram on the course over time of the detection of closed barriers.

FIG. 6 shows a schematic representation of the position and type of traffic paths detected by the device and the position of the barriers.

DETAILED DESCRIPTION OF THE INVENTION

Figure 1:
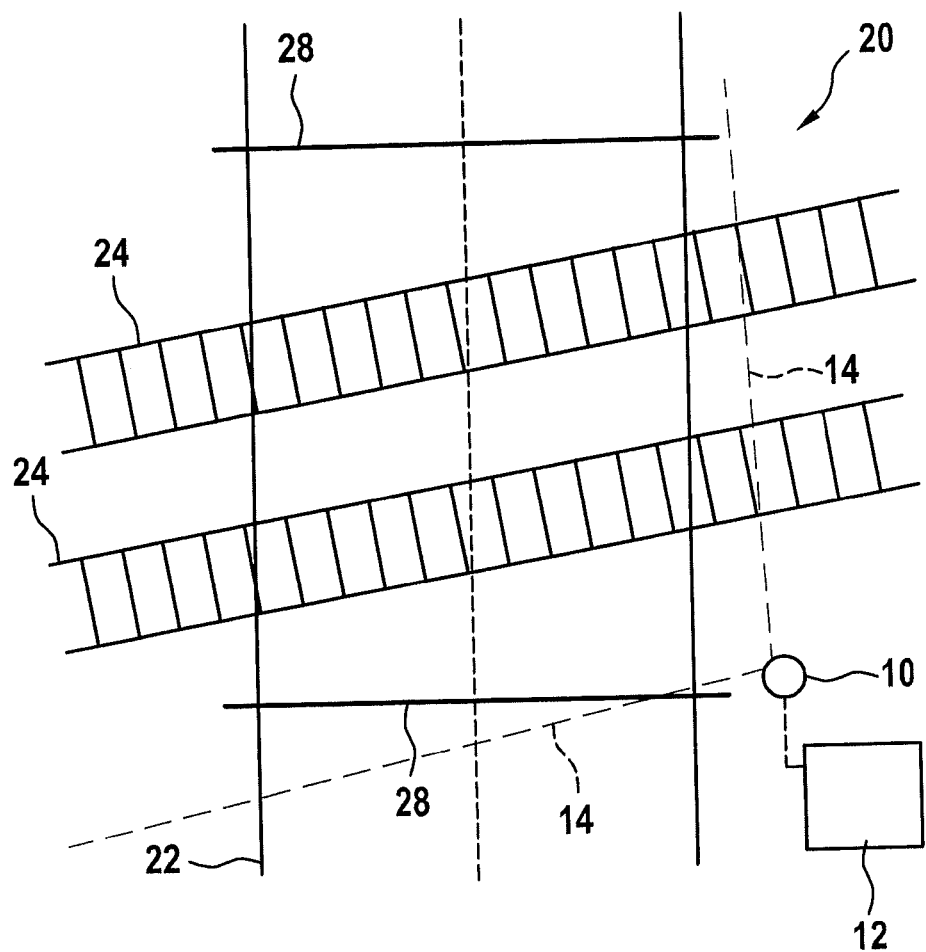
FIG. 1 shows a schematic top view of a grade crossing having a device for danger zone monitoring.

FIG. 1 schematically shows a radar sensor 10 and an identification unit 12 that is connected to it or integrated into it. Radar sensor 10 is an FMCW radar sensor having a send/receive device, which includes a patch antenna array, and has a schematically shown field of view 14 which includes an azimuth angle range of at least 90°. A plurality of antenna elements are situated horizontally offset with respect to one another. Field of view 14 preferably includes an azimuth angle range of at least 160°.

Radar sensor 10 is situated at the edge of a danger zone 20 of a grade crossing, which is included in field of view 14.

In field of view 14 there is a road 22 that crosses danger zone 20 as well as a railroad track, crossing road 22, having tracks 24. Furthermore, for instance, in field of view 14 a pedestrian path 26 (FIG. 2) runs, that crosses the railroad track, through danger zone 20, which is part of road 22.

FIG. 1 also schematically shows barriers 28 of the grade crossing.

In the situation shown in FIG. 1, after the installation of radar sensor 10, the position of danger zone 20 is not yet finally determined.

The determination of danger zone 20 that is to be monitored will now be explained below.

Figure 2:
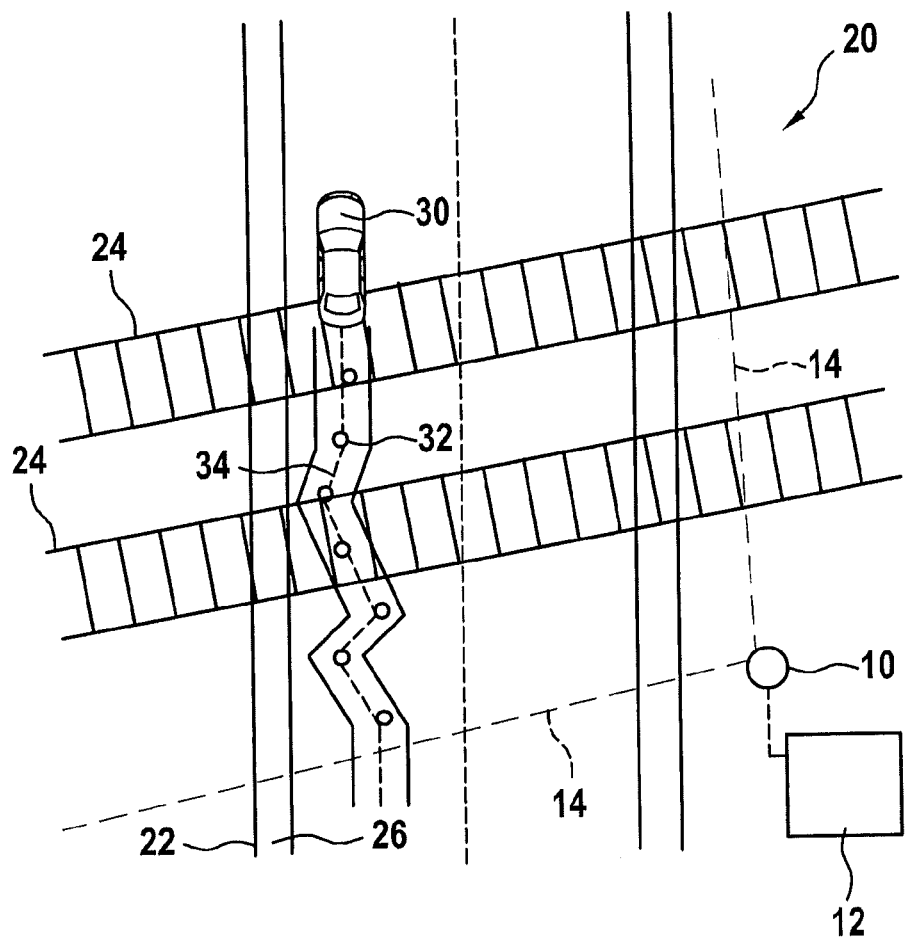
FIG. 2 shows an exemplary representation to explain the ascertainment of an object trajectory.

FIG. 2 shows, by way of an example, a situation having an object 30 detected by radar sensor 10, in the form of a vehicle. On detected object 30, identification unit 12 receives data on object positions 32, of which a plurality are shown in danger zone 20 in FIG. 2. Furthermore, identification unit 12 receives on recorded object 30, in a manner known per se, data on object speed, particularly the relative speed with respect to stationary radar sensor 10.

Identification unit 12 may optionally receive further object data on a recorded object 30, such as object reflection data, for instance, backscatter power, an extension in the horizontal direction, and/or a height of object 30. Height information may be determined from elevation angle-dependent reflection data of object 30, for example. A horizontal extension may be ascertained, for example, by assigning a plurality of reflection centers to one object 30.

From the course over time of the ascertained object position data 32, an object trajectory 34 is determined.

The determined object trajectories 34 are stored.

Figure 3:
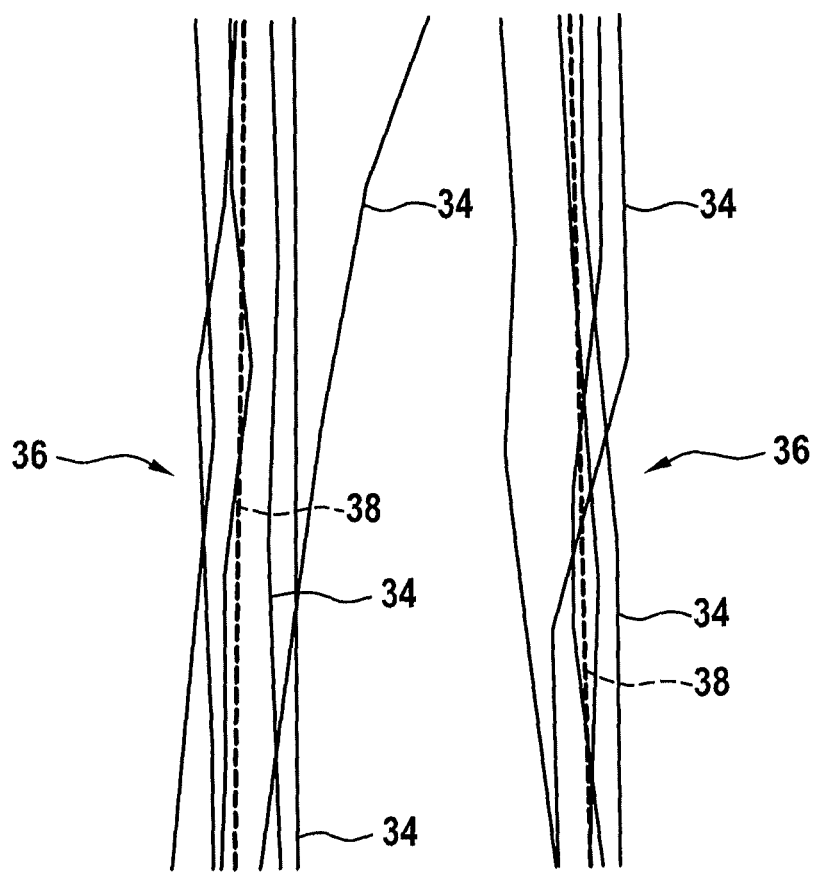
FIG. 3 shows a schematic representation of ascertaining a characteristic trajectory of an accumulation of trajectories.

FIG. 3 schematically shows accumulations 36 of object trajectories 34 running closely together. These accumulations 36 are determined. For this purpose, from object trajectories 34 determined for a plurality of objects 30, based on their respective similarities, groups of similar or approximately spatially coinciding trajectories 34 are formed, for example. For this purpose, a respective characteristic trajectory 38 may be determined, for example. The characteristic trajectory 38 is smoothed optionally or straightened out, and is then determined as the position of a traffic path.

A distinction of the type and/or width of the traffic path may take place, for example, using a spatial scattering within an accumulation of trajectories 34, from ascertained object extensions and/or from further object backscatter properties. In this connection, trajectories 34 may optionally be distinguished with the aid of their direction of motion. Unidirectional traffic paths, traffic lanes and track paths, may be distinguished from bidirectional traffic paths, such as pedestrian paths.

During the phase of identification, for example, of the danger zone, traffic paths may be ascertained according to the method described below.

The recorded objects 30 are classified and are each assigned respectively to the groups train, vehicle and possibly person. The classification may be made, for instance, with the aid of radar backscatter properties, the extension and/or the height of detected objects 30.

The object positions of the detected objects 30 are determined over a time interval.

From the changes with time of the object positions, which are assigned to an object 30, a trajectory 34 of object 30 is ascertained.

While for a plurality of objects 30, a respective object trajectory 34 is determined, accidental errors of a single trajectory determination may be compensated for.

For each object 30, object properties such as an extension and/or a height are determined, for instance.

For the respective group of objects 30, for a respective group, characteristic trajectories 38 and optional characteristic properties are determined. Thus, on road 22 shown in FIG. 2, for the group "vehicle", for example, two characteristic trajectories 38, corresponding to the two roadway directions of road 22, may be determined. Similarly, for the group "train", two characteristic trajectories corresponding to the two track paths 48 or tracks 24 of the railroad track may be determined. In a similar manner, for the group "person", two characteristic trajectories 38 may be determined, for example, which correspond to the courses of the respective pedestrian paths 26 on each side of road 22.

From the ascertained trajectories 34 or characteristic trajectories 38 to the respective groups of objects, a conclusion is drawn on roadway lanes 40, 42, pedestrian paths 44, 46 and tracks 24 or track paths 48. One characteristic trajectory 38 corresponds, for example, to an estimated position of a path. One position of a track path 48 may include the position of corresponding track 24 and optional information on a width of the path or a maximum or typical train width.

Since a plurality of trajectories 34 of individual objects 30 go into the determination of the characteristic trajectories 38, outliers, such as a passing vehicle, do not matter much. Consequently, the positions and, if necessary, the spatial extension of the traffic paths may be reliably determined.

The object speed, for example, may also go into the classification of objects into the individual groups, provided a respective object speed allows one to conclude on a certain groups or to exclude a group.

During the identification phase of the device, the position of barrier straight lines is also ascertained, according to the method described below.

Figure 4:
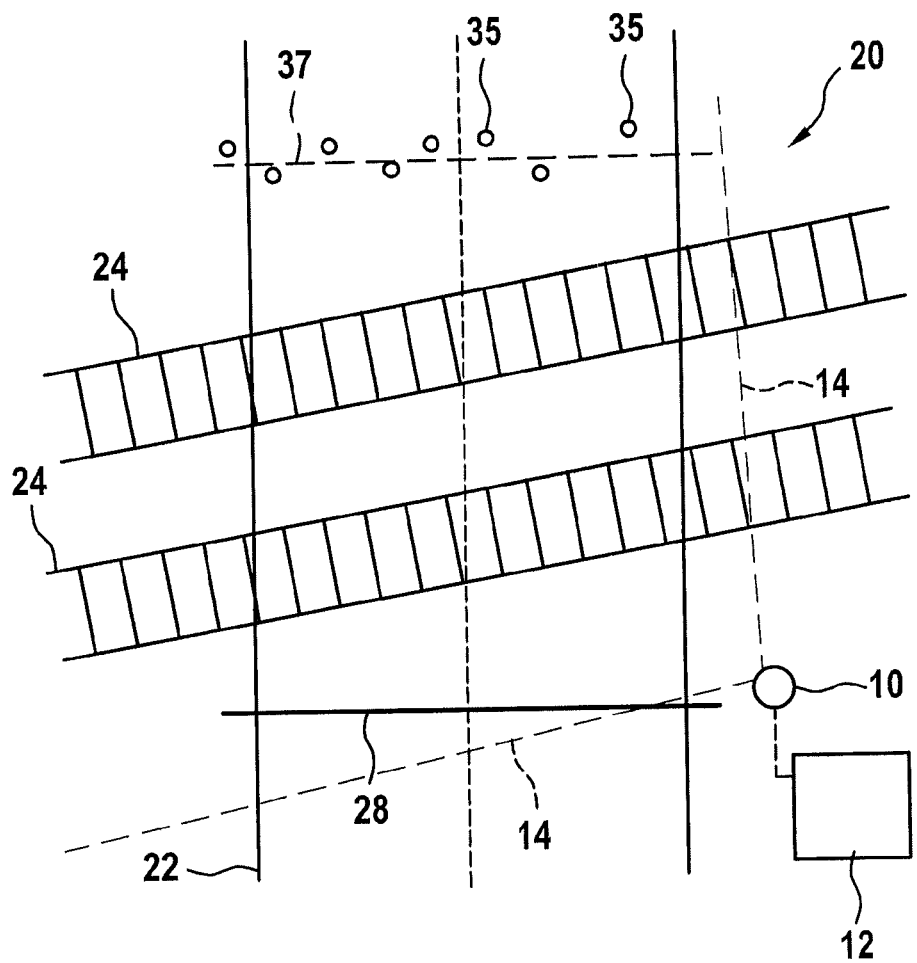
FIG. 4 shows a schematic representation of ascertaining a barrier straight line.

FIG. 4 schematically shows object or positions of radar reflections 35 which originate with elements of a barrier 28 in the closed state. The elements may include, for example, components at the barrier boom such as screws, attachment parts or the like. In a first step, relevant object locations or radar reflections 35 are determined, which correspond to a respective barrier 28. This may take place with the aid of object properties of the located objects. For example, the object locations belonging to a barrier in the closed state have a relative speed of zero with respect to radar sensor 10 that remains stationary, they originate with a height range restricted to a maximum height of a barrier in the closed state, and their position usually does not change during several recordings, while the respective barrier 28 is in the closed state.

Furthermore, radar reflections 35 belonging to a barrier 28 may also be identified in that they lie approximately on a straight line in the two-dimensional horizontal monitored range, that is, for example, on a straight line in the projection of field of view 14 onto a horizontal plane, shown in FIG. 4.

For the identification of a straight line one may use, for example, an algorithm corresponding to a Hough transform.

In a further step, a barrier straight line 37 is determined, on which radar reflections 35, belonging to the barrier, lie approximately. In other words, the position of a barrier straight line is determined by adapting geometric parameters of a straight line to the positions of the object locations or radar reflections 35. Such an ascertained barrier straight line 37 is drawn in on FIG. 4, for example. The position of the barrier straight lines may be determined using linear regression, for example.

The detection, thus carried out, of a barriers 28 or the ascertainment, thus carried out, of a barrier straight line 37 may be verified, for instance, by detecting that, in the time lapse, the appearing and the vanishing of object locations or radar reflections 35, which correspond to the closed barrier 28, are detected corresponding to the closing and opening of barriers 28. Based on the detection of the appearing and vanishing of the object locations or radar reflections 35, one may also draw conclusions on the appertaining of the respective radar reflections 35 to barrier 28, and one may draw conclusions, for example, on initial and/or end points of a respective barrier 28 on the barrier straight line 37.

Consequently, initial points and end points of a respective barrier 28 may be determined.

FIG. 5 shows schematically time sections X occurring in the course of time t, in which radar reflections 35 belonging to a closed' barrier are detected, interrupted by longer time sections O, in which these radar reflections 35 are omitted. Time intervals O correspond to open barrier 28, while time intervals X correspond to the closed barrier. Below that, time sections Z are shown, in which, for instance, an object of group "train" is detected, as well as time sections P, in which, for example, passenger cars or persons in a space between barriers 28 are detected. Sections Z and P are each interrupted by time sections O, in which corresponding radar reflections are omitted.

After the identification of the traffic path and the ascertainment of the position of the barrier straight lines, in identification unit 12, the positions, shown schematically in FIG. 6, of roadway lanes 40, 42, pedestrian paths 44, 46, track paths 48 as well as the barrier straight lines 37 are stored with initial and end points. From these data one may then conclude upon a danger zone 20 to be monitored. For this purpose, for example, the ascertained traffic paths, possibly together with safety strips 50 running additionally along the traffic paths, are geometrically trimmed to a danger zone 20, which lies within an e.g. four-cornered zone, which is generated by barrier straight lines 37 restricted by their initial and end points.

The danger zone 20 to be determined is defined, for example, by two opposite straight lines 52 which each run between a barrier straight line 37 and track path 48 lying closest to it. In other words, the two lines 52 generate the four-cornered danger zone 20. In this context, respective line 52 may be determined by a specified minimum distance of the respectively closest ascertained track path 48, including a safety strip 50, and its length extension may be determined by the traffic paths 40, 42, 44, 46 which cross track paths 48. In this context, an additional safety strip may optionally be calculated in. Alternatively, the extension of lines 52 may also be determined by the width of the zones generated by the barrier straight lines 37 between their initial and end points.

In the manner as described, the determination of danger zone 20 may take place according to a specified definition.

Figure 7:
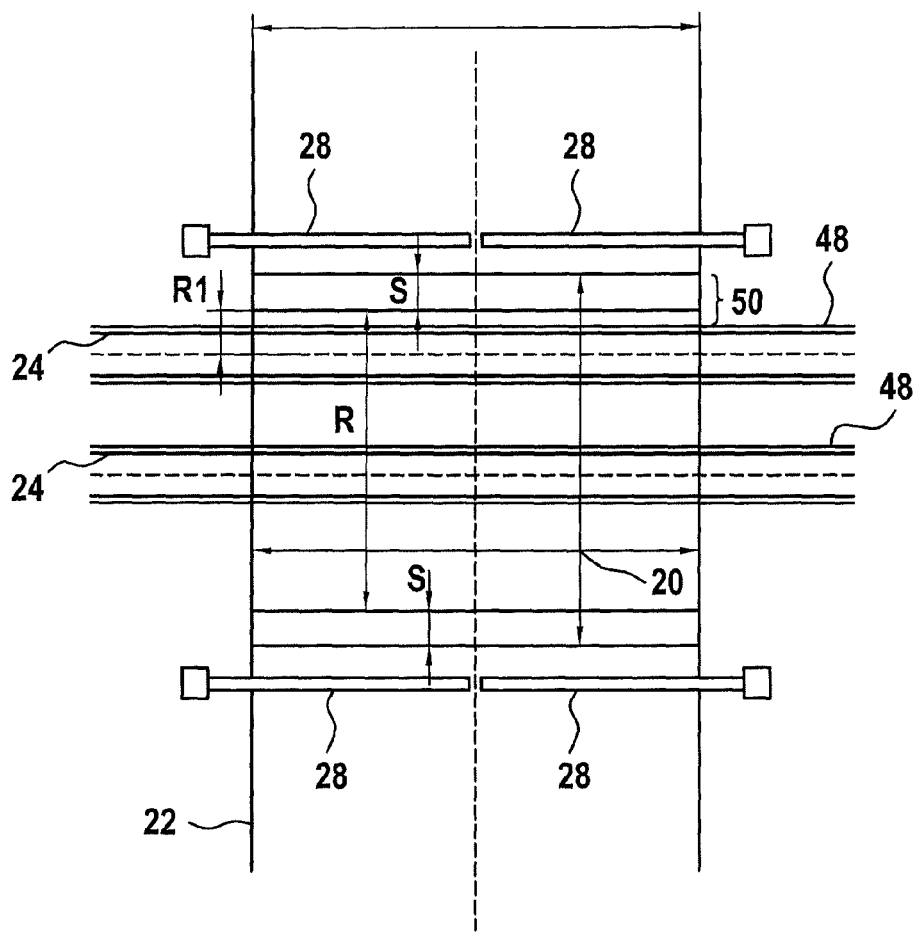
FIG. 7 shows a schematic representation to explain a definition of a danger zone.

FIG. 7 shows schematically the definition of danger zone 20 as an area to be monitored in the light of width D [FOOT not marked] of road 22 including possible bicycle or pedestrian paths, and in a transverse direction to this, in the light of width R of a regulating light space in addition to a safety distance S on both sides, between rails 24 and barriers 28. Width R is defined, for instance, by a minimum distance R1 from the center line of the respective outer rails 24. Safety strip 50 is thus determined by minimum distance R1 and safety distance S.

By the method described and the device described, a regulation-conforming automatic determination is able to take place of danger zone 20 that is to be monitored.

In the further operation of the danger zone monitoring device, the ascertained danger zone 20 is then monitored using radar sensor 10. For this purpose, for example, detections of objects may be evaluated which are recorded by radar sensor 10 within danger zone 20. The device may be set up for the purpose of outputting, for instance, a notification that danger zone 20 is clear of objects when no objects are detected within danger zone 20.

In the operation of the danger zone monitoring device, it may be detected, with the aid of a detection of radar reflections 35 by closed barriers 28, whether a respective barriers 28 is closed or not. Consequently, it may be detected whether all barriers 28 of the grade crossing were completely closed or not. The device may, for instance, output a closed notification in the case of a detection for the position of barrier straight lines 37 that is to be expected for the closed state of barriers 28.

While, in the example described, only one radar sensor 10 was described, it is also conceivable that the device includes a plurality of radar sensors, whose fields of view may optionally overlap. In particular, several sensors 10 may be situated at different positions, in a stationary manner.

What is claimed is:

1. A device for identifying a danger zone to be monitored at a grade crossing, comprising:
   at least one radar sensor for detecting objects moving through the grade crossing: and
   an identification unit configured to:
   ascertain trajectories of the objects detected by the radar sensor from sequences over time of object positions of respective objects moving through the grade crossing and detected by the radar sensor;
   identify a position of at least one traffic path with the aid of an accumulation of the object trajectories;
   determine, with the aid of radar reflections, when barriers of the grade crossing are closed;
   ascertain positions of barrier straight lines with the aid of radar reflections of the closed barriers; and
   determine the danger zone to be monitored based on the detected position of the at least one traffic path and on the ascertained position of the barrier straight lines.

2. The device as recited in claim 1, wherein the identification unit is configured to identify positions of at least two crossing traffic paths with the aid of two respective accumulations of object trajectories.

3. The device as recited in claim 2, wherein at least one of the at least two crossing traffic paths is a track path, and wherein the identification unit is configured to identify a position of the track path with the aid of an accumulation of object trajectories of objects moving along the track path, and to identify a position of at least one traffic path which crosses the track path with the aid of at least one additional accumulation of object trajectories of objects moving along the at least one traffic path which crosses the track path.

4. The device as recited in claim 2, wherein the identification unit is configured to geometrically trim, based on the ascertained position of the barrier straight lines, the at least one traffic path whose position has been identified, to a zone within an area limited on opposite sides by the barrier straight lines.

5. The device as recited in claim 2, wherein the identification unit is configured to:
   (i) determine object extensions with the aid of object reflections appertaining to respectively detected objects;
   (ii) identify a position and a type of at least one traffic path with the aid of an accumulation of object trajectories and with the aid of the object extensions of the respective objects assigned to the object trajectories, wherein the type of at least one traffic path is selected from types including a track path, a roadway lane, and a footpath.

6. The device as recited in claim 2, wherein the identification unit is configured to classify objects which are moving in the danger zone and recorded by the radar sensor with the aid of object reflections appertaining to the respective objects, into object classes of at least one of objects of different sizes and types, wherein trains are assigned to a first object class and one of (i) passenger cars or (ii) persons are assigned to a second object class.

7. The device as recited in claim 6, wherein the identification unit is configured to identify the position of at least one traffic path with the aid of an accumulation of object trajectories related to a selected object class.

8. The device as recited in claim 6, wherein the at least one radar sensor includes a wide-angle radar sensor having a stationary antenna system whose field of view includes an azimuth angle range of at least 90°.

9. The device as recited in claim 6, wherein the at least one radar sensor includes an FMCW radar sensor which is configured to determine an object position and an object speed of a recorded object.

10. The device as recited in claim 2, wherein the identification unit is configured to verify the ascertained position of barrier straight lines by detection of time intervals during which both radar reflections of the closed barriers are detected and radar reflections of a train are detected, interrupted by time intervals in which both radar reflections of the closed barriers are omitted and radar reflections of a passenger car or a person are detected.

11. A method for identifying a danger zone to be monitored at a grade crossing by using location data obtained by at least one radar sensor, in whose field of view the danger zone lies, comprising:
   ascertaining trajectories of objects detected by the radar sensor from sequences over time of object positions of respective objects detected by the radar sensor and moving through the grade crossing;
   identifying a position of at least one traffic path with the aid of an accumulation of the object trajectories;
   determining, with the aid of radar reflections, when barriers of the grade crossing are closed;
   ascertaining the positions of barrier straight lines with the aid of radar reflections of the closed barriers; and
   determining the danger zone to be monitored based on the detected position of the at least one traffic path and on the ascertained position of the barrier straight lines.

12. The method as recited in claim 11, further comprising:
   verifying the ascertained position of barrier straight lines by detecting time intervals during which both radar reflections of the closed barriers are detected and radar reflections of a train are detected, interrupted by time intervals in which both radar reflections of the closed barriers are omitted and radar reflections of a passenger car or a person are detected.

13. The device as recited in claim 1, wherein the device is configured to monitor the danger zone of the grade crossing, and output a notification based on monitoring.

14. The device as recited in claim 13, wherein the notification is a notification that the danger zone is clear of objects.

15. The device as recited in claim 13, wherein the notification is a notification regarding a position of the barriers.

16. The method as recited in claim 11, further comprising:
   monitoring the danger zone; and
   outputting a notification based on the monitoring.

17. The method as recited in claim 16, wherein the notification is a notification that the danger zone is clear of objects.

18. The method as recited in claim 16, wherein the notification is a notification regarding a position of the barriers.

\* \* \* \* \*